May 23, 1939.  D. G. TAYLOR  2,159,513
CONTROL DEVICE
Filed Aug. 7, 1937  3 Sheets-Sheet 1

INVENTOR
Daniel G. Taylor
BY HIS ATTORNEY
George H. Fisher

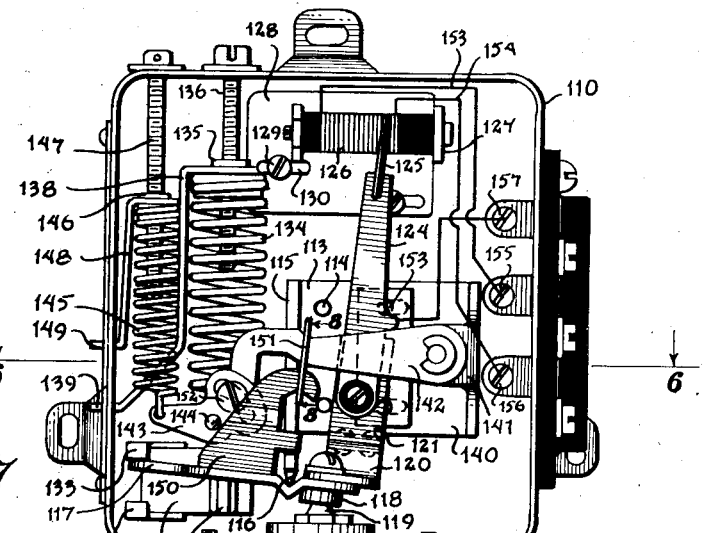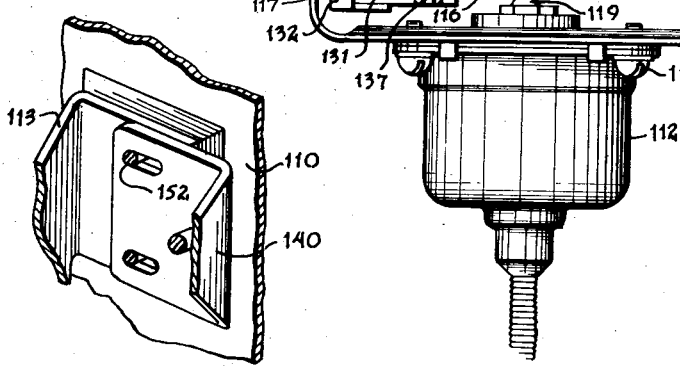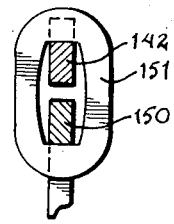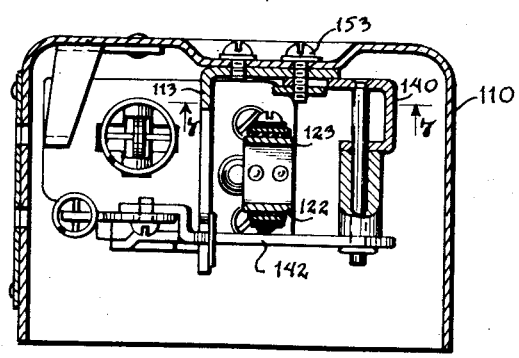

May 23, 1939.  D. G. TAYLOR  2,159,513
CONTROL DEVICE
Filed Aug. 7, 1937  3 Sheets-Sheet 3

INVENTOR
Daniel G. Taylor
BY HIS ATTORNEY
George H. Fisher

Patented May 23, 1939

2,159,513

UNITED STATES PATENT OFFICE 2,159,513

CONTROL DEVICE

Daniel G. Taylor, Minneapolis, Minn., assignor to Minneapolis-Honeywell Regulator Company, Minneapolis, Minn., a corporation of Delaware Application August 7, 1937, Serial No. 157,933

18 Claims. (Cl. 74—99)

This invention relates to control devices in general and more particularly to control devices of the type disclosed in Lewis L. Cunningham Patent 2,041,050 granted May 19, 1936.

It is an object of this invention to provide a new and novel mechanism for adjusting the differential of operation of a control device.

A further object is to provide a mechanism whereby the operating differential may be adjusted without disturbing the temperature setting of the device.

Another object is to provide a device which will move an arm gradually in accordance with a condition change and where the amount of movement for a given change in the condition may be varied.

Another object is to provide a mechanism wherein the range of condition change necessary to move the control device completely may be varied by keeping the mid-point of the range constant and varying the upper and lower limits, or by keeping the upper limit constant and varying the lower limit, or by keeping the lower limit constant and varying the upper limit.

Another object is to provide a mechanism wherein the range of condition change necessary to move the control device completely may be varied, at the same time keeping any one point in the range constant and varying the limits.

Further objects will become apparent from the description and drawings forming a part of this specification.

For a more thorough understanding of this invention reference is made to the accompanying drawings in which:

Figure 5 is an elevational view of another form of this invention;

Figure 6 is a sectional view taken substantially along the line 6—6 of Figure 5;

Figure 7 is a fragmentary view taken substantially along the line 7—7 of Figure 6;

Figure 8 is a fragmentary view taken substantially along the line 8—8 of Figure 5;

Figure 3:
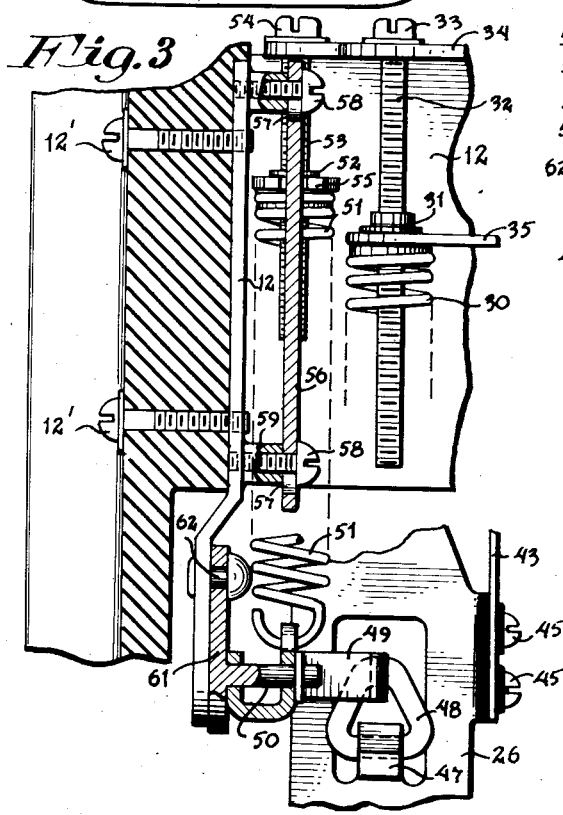
Figure 3 is a partial sectional view looking to the right in Figure 1.
Figure 11:
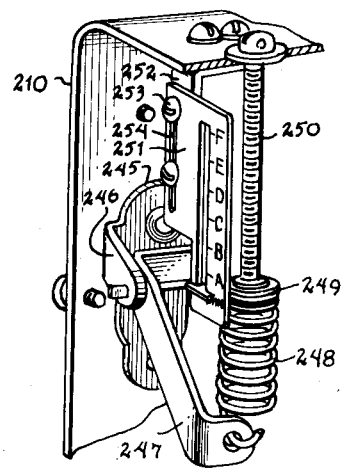
Figure 11 is a perspective view of a portion of the mechanism included in Figure 9.

Referring now to Figures 1 to 4 inclusive, 10 designates a base plate preferably made of insulating material and having suitable electrical terminals 11. A bracket 12 is secured to the base 10 as by means of screws 12' (Figure 3). This bracket 12 carries a stud 13 upon which are suitably mounted resistance elements 14 and 15. Also secured to the bracket 12 is a stud 16 carrying nuts 17 and 18 which form limit stops as will be pointed out more fully hereafter.

Secured to the base 10 is a bracket 20 upon which is mounted a bellows 21 by means of a screw 22. The bellows 21 preferably contains a volatile fluid so that upon an increase in the temperature affecting bellows 21, the bellows expands, and upon a decrease in temperature the bellows contracts. A bracket 23 is secured to the base 10 and a rod 24 extending between the brackets 20 and 23 brace and hold the various parts in assembled relation. The bracket 23 carries a knife edge or fulcrum 25 upon which is pivotally mounted a lever 26. The bellows 21 carries a plunger 27 which engages in a depression in the lever 26. A knife edge arrangement 28 engages the lever 26 and is carried by a screw 29 which, in turn, is secured by a nut 29' to one end of spring 30. The other end of the spring 30 is fastened to a nut 31 which is screw threadedly mounted on a screw 32 having a head 33 which projects loosely through a hole in the bracket 12. The nut 31 is provided with an extension 35 which slides in a slot 36 of a plate 37. The plate 37 is provided with elongated slots 38 through which extend screws 39 for adjustably mounting the plate 37 to the bracket 12. The extension 35 operating in the slot 36 prevents rotation of the nut 31 so that by turning the screw 32 the nut 31 is moved upwardly or downwardly to vary the tension in the spring 30. The extension 35 also cooperates with indicia carried by the plate 37 to indicate the tension in the spring 30. The screw 29 which carries the fulcrum member 28 provides a factory calibration of this portion of the instrument. The instrument may be further calibrated by longitudinally adjusting the scale plate 37. The lever 26 is provided with an upwardly extending portion 40 located adjacent the stop nuts 17 and 18.

Upon an increase in temperature affecting the bellows 21 the plunger 27 operates the lever 26 in a counterclockwise direction about the pivot 25 against the action of the spring 30. Upon a decrease in temperature affecting the bellows 21 the spring 30 rotates the lever 26 in a clockwise direction about the pivot 25. The stop nuts 17 and 18 limit the amount of movement of the lever 26 in either direction. By suitably adjusting the tension in the spring 30 the temperature setting of the instrument may be varied at will.

The lever 26 carries a bracket 42 to which are secured resilient sliders 43 and 44 as by means of screws 45. Suitable insulating pads electrically insulate the sliders 43 and 44 from each other and from the bracket 42. The sliders 43 and 44 slidably engage the resistance elements 14 and 15 to provide adjustable rheostats or potentiometers depending upon the manner in which these resistance elements and sliders are connected to the various terminals 11. The sliders 43 and 44 are therefore moved to the left with respect to resistance elements 14 and 15 upon a temperature rise and move to the right upon a temperature fall. The sliders 43 and 44 are therefore positioned directly in accordance with the value of the temperature affecting the bellows 21.

An extending portion 47 is struck out from the lever 26 and one end of a link 48 engages this portion 47. The other end of the link 48 engages a lever 49 which is pivoted upon a pin 50. One end of a spring 51 is connected to the lever 49 and the other end thereof is connected to a nut 52 which is screw threadedly mounted on a screw 53 having a head 54 inserted loosely through a hole in the bracket 12. The nut 52 is provided with a bifurcated extension 55 slidably engaging a scale plate 56. The scale plate 56 is provided with slots 57 through which extend screws 58 for slidably mounting the scale plate 56 on the bracket 12. The bifurcated extension 55 prevents rotation of the nut 52 and therefore rotation of the screw 53 increases or decreases the tension with the spring 51. The amount of tension in the spring 51 is indicated by the extension 55 and the indicia carried by the plate 56. The plate 56 may be longitudinally adjusted for calibration purposes.

The pivot pin 50 for the lever 49 is carried by an arm 61 pivoted at 62 to the bracket 12. The arm 61 is provided with a slot 62' through which extends a screw 63 for adjustably holding the arm 61 in any of its rotatably adjusted positions. The spring 51 is adapted under certain circumstances to add resistance to the movement of the bellows 21.

Figure 1:
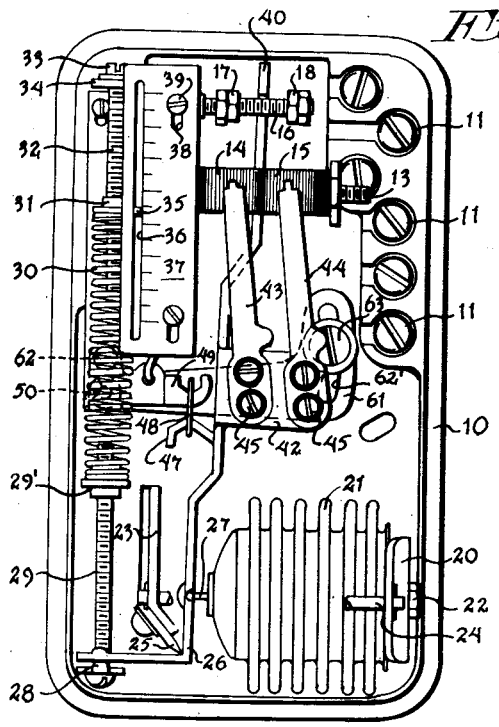
Figure 1 is an elevational view of one form of this invention.
Figure 2:
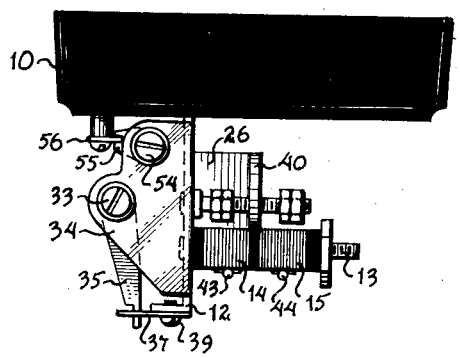
Figure 2 is a plan view looking down on Figure 1.
Figure 4:
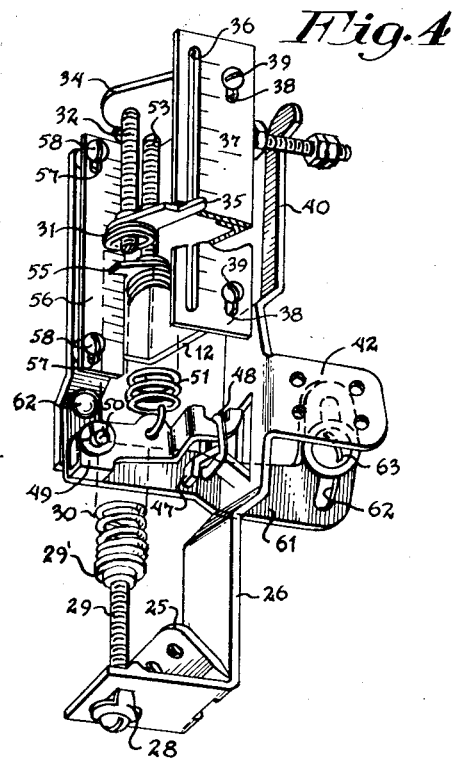
Figure 4 is a perspective view of a portion of the mechanism utilized in Figure 1.

With the parts in the position shown in Figure 1 the extension 40 of lever 26 is midway between the stop nuts 17 and 18, the sliders 43 and 44 are spaced midway along the resistance elements 14 and 15, the screw 63 is midway of the slot 62 and the link 48 is in line with the fulcrum point 25 as shown by the dot and dash line A in Figure 1. Since the two contact points of link 48 with lever 49 and struck out portion 47 of lever 26 are directly in line with the pivot point 25 of lever 26, any variation of the pull exerted by link 48 on lever 26 can have no effect upon its position. This is because the force is exerted directly in line with the pivot and hence there is no lever arm to cause a turning movement. If, however, the lever 26 is moved in a counter-clockwise direction upon expansion of the bellows 21 the link 48 is moved in a clockwise direction out of line with the fulcrum 25. This clockwise movement of the link 48 produces the effective moment arm or leverage arm formed thereby so that the spring 51 increasingly retards movement of the lever 26.

Therefore more effort must be expended by the bellows 21 to move the lever 26 a predetermined distance in a counter-clockwise direction than if the link 48 and the spring 51 were not present. Since the effective moment arm which transmits the retarding effect of the spring 51 increases from zero in the position shown in Figure 1 at a substantially constant rate as the lever 26 is rotated in a counter-clockwise direction, the amount of retarding force of the spring 51 is increased at a substantially constant rate.

In a like manner contraction of the bellows 21 as a result of a decrease in temperature causes the spring 30 to move the lever 26 in a clockwise direction and this clockwise movement of lever 26 from the position shown in Figure 1 is retarded by the increasing moment arm afforded by the counter-clockwise rotation of the link 48. The amount of retarding effect of the spring 51 increases approximately in proportion to the amount of clockwise rotation of the lever 26 from the position shown in Figure 1.

From the above it is seen that with the parts in the position shown in Figure 1 the spring 51 has substantially no effect upon the movement of the lever 26 since the link 48 aligns with the fulcrum 25, but as the link 48 is moved out of alignment with the fulcrum 25 in either direction, the spring 51 increasingly retards movement of the lever 26. The amount of retarding may be varied by suitably adjusting the tension in the spring 51. If there be very little tension in the spring a 1° temperature change may cause complete movement of the sliders 43 and 44 across the resistance elements 14 and 15, but if the tension in the spring 51 is increased the amount of temperature change required to move the sliders 43 and 44 completely across the resistance elements 14 and 15 is correspondingly increased. It follows then that by adjusting the spring 51 the differential of the control instrument is varied independently of the temperature setting of the instrument which is controlled by the adjustment of the spring 30. Therefore the temperature setting of the instrument and the differential setting may be independently adjusted at will. Regardless of the differential setting the sliders 43 and 44 will assume a mid position with respect to the resistance elements 14 and 15 when the temperature assumes a given value. In other words, when the temperature affecting the bellows 21, is say, 70° the sliders 43 and 44 will be in a mid position regardless of the tension in the spring 51 since the spring 51 has no effect when the sliders are in this position. By adjusting the differential of the instrument both ends of the range are varied while the mid point of the range is maintained constant.

The above mode of operation is predicated on the lever 61 being adjusted in the mid position as shown in Figure 1. If, however, the lever 61 is adjusted downwardly so that the screw 63 engages the upper end of the slot 62 the pivot point 50 for the lever 49 is shifted to the left which causes counter-clockwise rotation of the link 48. The link 48 is thereupon moved out of alignment with the fulcrum 25 and in order to align the link 48 with the fulcrum 25 the sliders 43 and 44 must be moved to the left. With this adjustment therefore the link 48 is in alignment with the fulcrum 45 when the sliders 43 and 44 are in the extreme left-hand position. At this position of the sliders 43 and 44 the spring 51 has no effect by reason of the alignment of link 48 between the fulcrum 45. When, however, the sliders 43 and 44 are moved to the right with respect to the resistance elements 14 and 15, the spring 51 immediately becomes operative to retard this movement and the amount of retarding effect increases as the sliders 43 and 44 are moved to the right. Therefore, with the parts adjusted in this manner a tightening of the spring 51 increases the differential but the left hand portion of the range of movement is maintained constant regardless of the differential adjustment. In other words the left-hand end of the range of movement of the sliders 43 and 44 remains constant while the right-hand range of movement is varied.

Assume now that the arm 61 is adjusted upwardly so that the screw 63 engages the lower end of the slot 62, the pivot pin 50 is moved to the right and under these circumstances the link 48 aligns with the fulcrum 45 only when the sliders 43 and 44 are in the extreme right-hand position. By adjusting the differential spring 51 with the arm 61 in this position the right hand end of the range of movement remains constant while the left-hand end is varied.

From the above it is seen that there is provided a temperature responsive instrument wherein means are provided for adjusting the temperature setting thereof, wherein means are provided for independently adjusting the differential of operation of the instrument and wherein means are also provided for maintaining the mid point of the range constant, one end point of the range constant or the other end point of the range constant or any given point within the range may be maintained constant regardless of the differential adjustment.

Referring to the second modification as disclosed in Figures 5 to 8, 110 designates a cup shaped casing which contains the control device. Attached to the bottom of this casing as by screws 111 is a bellows housing 112. Bracket 113 which is attached to the back of casing 110 by screws 114 has an upstanding arm 115 having at its end a knife edge 116 which seats in a dwell in lever 117. Lever 117 has a bearing member 118 against which bears pin 119 which is connected to a bellows member within housing 112. Connected to the right-hand end of lever 117, looking at Figure 5, is a supporting member 120 on which is mounted a U-shaped bracket 121 having two legs 122 and 123 located one directly behind the other as viewed in Figure 5, each of which carries a flexible arm 124 which in turn carries a sliding contact member 125. Each of these sliding contact members engages a potentiometer 126 also located one directly behind the other as viewed in Figure 5. These potentiometers are supported on an upstanding arm 127 of a bracket member 128 which is adjustably secured to casing 110 by means of screws 129 and slots 130. Also attached to casing 110 is a U-shaped bracket 131 having two legs 132 and 133 which act as stops for lever member 117 limiting its movement in either direction.

As the bellows member expands it swings lever 117 in a counter-clockwise direction which moves the sliding contacts 125 to the left as viewed in Figure 5. Conversely, as the bellows member contracts the sliding contacts are moved towards the right in a manner to be disclosed. Spring 134 is supported by a nut 135 which in turn is screw threadedly attached to a screw 136 which extends loosely through a hole in casing 110. The lower end of spring 134 carries a depending member which supports a knife edge 137 which engages underneath lever 117. The function of this spring is to tend to rotate lever 117 in a clockwise direction about its pivot 116 in opposition to the force exerted on it by the bellows. Rigidly attached to nut 135 is an arm 138 which has an end 139 which projects through a slot in casing 110. As screw 136 is rotated this arm 138 will prevent the rotation of nut 135 which will move either up or down depending upon the direction of rotation of screw 136. Adjustment of this spring 134 in this manner will adjust the position of contact 125 with respect to a given value of the condition to which the bellows responds. Thus assuming that the bellows responds to temperature changes, the temperature setting of the device will be varied by changing the tension of spring 134. Bracket 140 has an upstanding arm 141 upon which is pivoted a lever 142 to the other end of which is pivoted a second lever 143 as at 144. To this lever is attached a second spring member 145 whose upper end is attached to a nut 146. This nut is screw threadedly attached to a screw 147 which depends loosely through a hole in casing 110. Also rigidly attached to this nut is an arm 148 which has one end 149 which extends through a slot in the casing 110. This arm 148 prevents the rotation of nut 146 when screw 147 is rotated and therefore as screw 147 is rotated this nut 146 will move up or down to adjust the tension of spring 145. Lever 117 has attached thereto a hooked member 150. A link 151 is engaged under this hooked member and also in a V slot in lever 142, thereby connecting them. Lever 143 is rotatably adjustable with respect to lever 142 by means of a screw and slot connection 152, which adjustment is intended to be made at the factory to initially set the device.

Assuming the parts to be in the position as shown in Figure 5, it will be noted that the points of contact between link 151 and levers 142 and 150 are aligned with knife edge 116 which engages lever 117. Therefore, any adjustment of the tension in spring 145 can have no turning effect on lever 117 due to the fact that the pull on this lever is directly against the pivot point and hence there is no lever arm. Now if the bellows raises pin 19, lever 117 will be rotated in a counter-clockwise direction, at the same time moving the contact point between link 151 and member 150 out of alignment with the other two. Spring 145 now exerts a force in opposition to this movement of the bellows which force gradually increases as the bellows continues to move in this direction. The tension of spring 145 being adjustable, the differential of the device or the unit of movement per degree change of condition can be varied without, in this case, varying the lower limit of the range in which the parts are shown in Figure 5. If, for example, it were desired that the center of the range were the one to remain fixed while the differential adjustment were made it would be necessary to slide bracket 140 to the left by means of the screw and slot connection 153 to casing 110. This would move the contact point of link 151 with the lever 142 to the left so that the bellows would have to assume its mid position before the contact points of link 151 with lever 142 and member 150 and pivot point 116 of lever 117 would be in alignment. Now if in this position spring 145 were adjusted it would have no turning effect on lever 117 because again there would be no effective lever arm. If the bellows were to rotate lever 117 in a counter-clockwise direction the contact point of link 151 with member 150 would move to the left and the spring 145 would exert a constantly increasing effect on continued movement. Again, if the bellows were to lower pin 19 spring 184 would rotate lever 117 in a clockwise direction and the contact point between link 151 and member 150 would move to the right and spring 145 would exert a constantly increasing opposing effect. In the same way the device could be adjusted so that the upper range could remain fixed as the differential setting is adjusted.

The potentiometer 126 is connected by wires 153 and 154 to terminals 155 and 156 and the sliding contact carrier arm 124 is connected to terminal 157, which terminals in turn are connected to outside control circuits in a well known manner.

Referring now to the third modification which is disclosed in Figures 9 to 12 inclusive, reference numeral 210 designates a cup-shaped casing which contains the control device. Attached to the bottom of this casing is a housing 211 for a bellows which acts as a sensitive device for operating the control device, this bellows being connected by means of a tubing 212 to respond to a condition to be controlled. Bracket 213 is attached to the back of the casing 210 and has a forwardly extending arm 214 at the bottom edge of which are two downwardly directed knife edges 215 (see Figure 10) for a purpose to be hereinafter disclosed. Spring 216 is rigidly connected at its top to a nut 217 which is screw threadedly attached to a screw 218 which loosely extends through a hole in housing 219 mounted on top of casing 210. Affixed to nut 217 is an arm 220 which projects outwardly through a slot in the side of casing 210 thus preventing rotation of nut 217 when screw 218 is rotated. Therefore upon rotation of screw 218 nut 217 will move in a vertical line and thus raise and lower the top of the spring 216 and adjust its tension. Fastened to the outside of casing 210 is a plate bearing indicia for cooperation with the end of arm 220 to indicate the position of nut 217 and therefore the tension of spring 216. This plate is covered by means of a transparent material such as Celluloid and is adjustably secured to the casing 210 by means of slot and screw connections 221. Extending from the bottom of spring 216 is a support or carriage for an upwardly directed knife edge 222. Cooperating with the three knife edges described is a lever member 223 having two V-shaped dwells 224 therein in which are seated the two knife edges 215 and which form a pivot for this lever. The lever also contains another V-shaped dwell in which is seated the knife edge 222. The tension spring 216 through its knife edge 222 tends to rotate this lever in a clockwise direction, but such rotation is opposed by a pin 226 seated in bearing member 227 of lever 223, which pin is connected to the bellows member. The raising of pin 226 by the bellows will therefore cause counter-clockwise rotation of the lever in opposition to the action of the spring 216 and lowering of pin 226 by the bellows will permit spring 216 to rotate the lever in a clockwise direction. Mounted on the back of casing 210 is a bracket 228 having two spaced arms 229 which act as stops for the lever 223. Mounted on the right-hand end of this lever is a U-shaped member 230 upon each leg of which is mounted a resilient arm 231 carrying a sliding contact member 232. Only one arm and contact are visible due to the fact that one is directly behind the other as viewed in Figure 9. Bracket 233 is adjustably mounted on the back of the casing member 210 and carries two potentiometers or resistances 234 on an upstanding arm thereof 235. The sliding contact members are arranged to cooperate with these potentiometers.

The apparatus thus far described is a condition responsive device for variably operating a pair of potentiometers, said device being adjustable by means of screw 218 which varies the tension of spring 216 acting against the bellows. There will now be described a mechanism for varying the differential of the device. This mechanism comprises a bracket 236 which is fixedly mounted on the left-hand side of lever 223. Pivotally mounted on this bracket 236 is a member 237 having an arcuate slot 238 formed about the pivot 239 as a center. Screw threaded in the bracket 236 is a screw 240 which also slidingly engages in the slot 238. Rotation of this screw in the proper direction will clamp bracket 236 and member 237 together. Rotatably mounted in bracket 236 is a pin member whose head 241 is eccentrically mounted with respect to its stem 242. Head 241 is loosely contained in a slot 243 in member 237 the width of which slot is the same size as the diameter of the head. To adjust the relative positions of the bracket 236 and member 237 it is necessary only to loosen screw 240 and rotate pin member 241 which acts as a cam in rotating member 237 about its pivot 239. After the proper relative position has been obtained the members may again be clamped tightly by tightening screw 240. Rigidly attached to the side of casing 210 is a bracket 245 having two arms 246 between which is pivoted a generally U-shaped member 247, one arm of which is connected with spring 248. The upper end of this spring is attached to nut member 249 which is in turn screw threadedly connected with a screw 250 loosely extending through a hole in the top of casing 210. Plate 251 is adjustably carried by bracket 252 by means of screws 253 in slot 254. An arm 257 which is rigidly attached to nut 249 rides in a slot 256 in plate 251, thus preventing rotation of the nut as screw 250 is rotated. This permits the upper end of spring 248 to be vertically adjusted by rotation of screw 250, the adjustment being indicated by indicia inscribed on plate 251. Members 237 and 247 are each provided with hooked arms which cooperate with a link 257 and are held together thereby.

As in the previous modifications when the contact points between link 257 and members 247 and 237 and the pivot point 215 of lever 223 are in a straight line, adjustment of the tension of spring 248 can have no rotating effect on the lever. This condition prevails with the parts in the position shown in Figure 9 which is in this instance the topmost point of the control range. Upon downward movement of pin 226 lever 223 will swing in a clockwise direction which will move the contact point between link 257 and member 237 to the right and out of line with the other two points. Now spring 248 will have an effect upon the rotation of lever 223 and will tend to retard this movement. As in the other two modifications, the amount of this effect, or the differential of the device, can be varied by adjusting the tension of spring 248. Assume for example that the device is arranged to respond to temperature and that the lower range of temperature desired is 68° F. and the upper limit desired is 72°; that is, a differential of 4°. With the parts in the position shown, it is necessary only to adjust the tension of spring 216 so that at 72° the slider contact is at the extreme left as shown. Now spring 248 is adjusted until a 4° fall in temperature is just sufficient to swing the slider contact 232 to the right side of the potentiometer.

Figure 9:
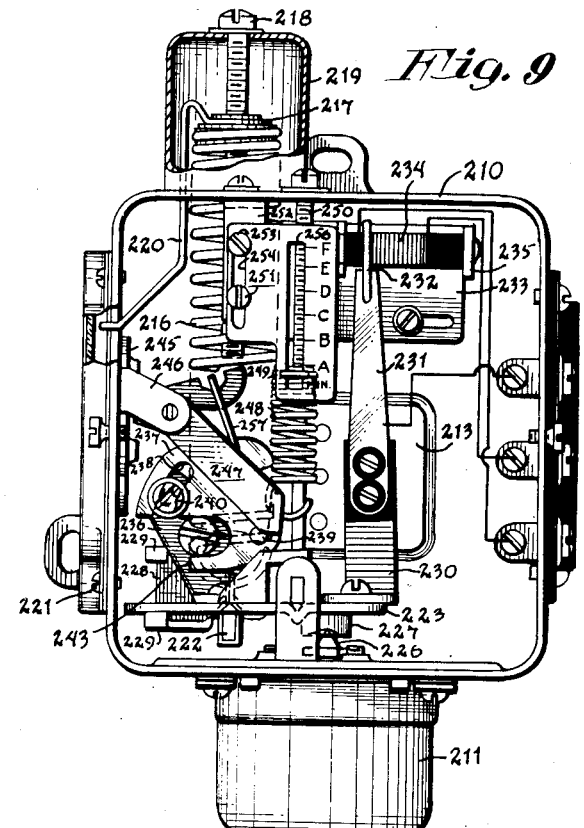
Figure 9 is an elevational view of still another form of this invention.
Figure 12:
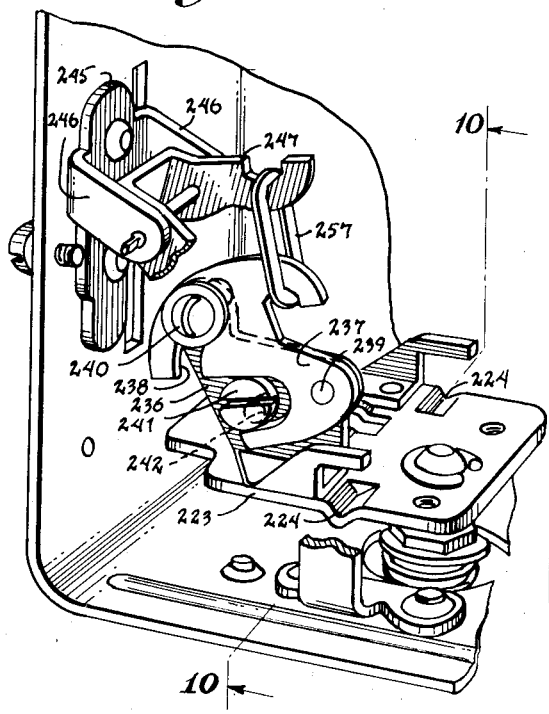
Figure 12 is a perspective view of another portion of the mechanism contained in Figure 9.
Figure 10:
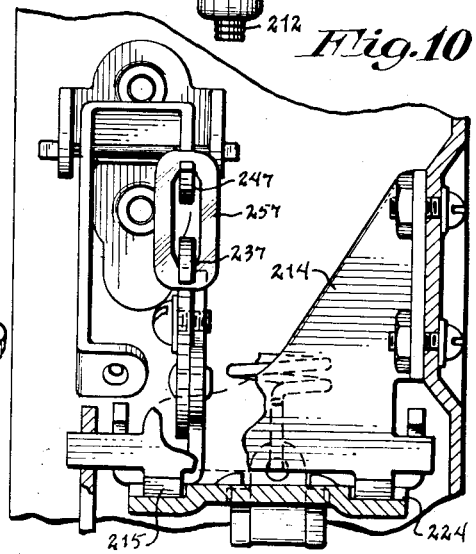
Figure 10 is a fragmentary view taken substantially along the line 10—10 of Figure 12.

The device is adjusted in Figure 9 so that the contact points between link 251 and hooked arms 247 and 237 are aligned with the pivot point 215 for lever 223 when the slider contact 232 is at the topmost point in the range. This means that the differential setting may be varied without varying the upper temperature limit. Thus assuming the limits are now 68° and 72°, if spring 248 were loosened the lower limit would be raised and the upper limit would remain at 72°. If spring 248 were tightened, the lower limit would be decreased and the upper limit would remain at 72°.

As in the other two modifications, the device may be adjusted so that any point in the range may be made to remain constant as the differential setting is adjusted. This is accomplished by rotating member 237 with respect to bracket 236 as described, thus moving the contact point of link 251 with member 237. In this manner the contact points of link 251 with members 236 and 237 and the pivot 215 of lever 223 can be placed in alignment at any point in the range of the device.

It is to be understood that the above disclosure is intended to be illustrative only and that various modifications within the scope of this invention will occur to those skilled in the art. Therefore the invention is to be limited only by the scope of the appended claims.

I claim:

1. In a mechanim of the character described, a pivoted lever, an adjustable spring member constantly tending to rotate said lever in one direction, a condition responsive member tending to rotate the lever in the opposite direction, a second lever, a tension link connecting said two levers and preventing separation thereof, an adjustable tension spring normally tending to cause movement of said second lever away from said first lever and thereby causing movement of said first lever in a direction to oppose the action of said condition responsive member, the arrangement being such that when the contact points of said link with said two levers are aligned with the pivot point of said first lever said tension spring has no rotative effect on said first lever, but as the condition responsive element rotates said first lever out of the above mentioned position said second spring increasingly resists said motion.

2. In a mechanism of the character described, a pivoted lever, an adjustable spring member constantly tending to rotate said lever in one direction, a condition responsive member tending to rotate the lever in the opposite direction, a second lever, a link connecting said two levers, a second adjustable spring normally tending to cause rotation of said second lever, the arrangement being such that when the contact points of said link with said two levers are aligned with the pivot point of said first lever said second spring has no rotative effect on said first lever, but when the condition responsive element rotates said first lever out of the above mentioned position said second spring increasingly resists said motion, and means for varying the position of the first lever at which its pivot is aligned with the two aforementioned contact points.

3. In a mechanism of the character described, a pivoted lever, an adjustable spring member constantly tending to rotate said lever in one direction, a condition responsive member tending to rotate the lever in the opposite direction, a second lever, a link connecting said two levers, a second adjustable spring normally tending to cause rotation of said second lever, the arrangement being such that when the contact points of said link with said two levers are aligned with the pivot point of said first lever said second spring has no rotative effect on said first lever, but when the condition responsive element rotates said first lever out of the above mentioned position said second spring increasingly resists said motion, and means for varying the position of the first lever at which its pivot is aligned with the two aforementioned contact points, said means comprising an adjustment for the support of said second lever.

4. In a mechanism of the character described, a pivoted lever, an adjustable spring member constantly tending to rotate said lever in one direction, a condition responsive member tending to rotate the lever in the opposite direction, a second lever, a link connecting said two levers, a second adjustable spring normally tending to cause rotation of said second lever, the arrangement being such that when the contact points of said link with said two levers are aligned with the pivot point of said first lever said second spring has no rotative effect on said first lever, but when the condition responsive element rotates said first lever out of the above mentioned position said second spring increasingly resists said motion, and means for varying the position of the first lever at which its pivot is aligned with the two aforementioned contact points, said means comprising a rotative adjustment for the support of said second lever.

5. In a mechanism of the character described, a pivoted lever, an adjustable spring member constantly tending to rotate said lever in one direction, a condition responsive member tending to rotate the lever in the opposite direction, a second lever, a link connecting said two levers, a second adjustable spring normally tending to cause rotation of said second lever, the arrangement being such that when the contact points of said link with said two levers are aligned with the pivot point of said first lever said second spring has no rotative effect on said first lever, but when the condition responsive element rotates said first lever out of the above mentioned position said second spring increasingly resists said motion, and means for varying the position of the first lever at which its pivot is aligned with the two aforementioned contact points, said means comprising a sliding adjustment for the support of said second lever.

6. In a mechanism of the character described, a pivoted lever, an adjustable spring member constantly tending to rotate said lever in one direction, a condition responsive member tending to rotate the lever in the opposite direction, a second lever, a link connecting said two levers, a second adjustable spring normally tending to cause rotation of said second lever, the arrangement being such that when the contact points of said link with said two levers are aligned with the pivot point of said first lever said second spring has no rotative effect on said first lever, but when the condition responsive element rotates said first lever out of the above mentioned position said second spring increasingly resists said motion, and means for varying the position of the first lever at which its pivot is aligned with the two aforementioned contact points, said means comprising a member adjustably connected to one of said levers for varying the contact point between said lever and said link.

7. In a mechanism of the character described, a lever pivoted at a point intermediate its two ends, an adjustably tensioned spring connected to said lever on one side of said pivot and holding a point on the other side of said pivot against a bellows member, a second lever, a screw loosely projecting downwardly through a hole in a fixed support, a nut threaded on said screw, said nut being held against rotation, a second spring one end of which is connected to said nut and the other connected to said second lever, a link connecting said levers, the contact points of said link with said levers being aligned with the pivot point of said first lever in one position thereof, at which time said second spring has no effect upon said first lever, said second spring increasingly resisting movement by said bellows member of said first lever out of said position in either direction, and means for varying the position at which the contact points of said link with said levers are aligned with the pivot point of said first lever.

8. In a mechanism of the character described, a pivoted lever, an adjustable spring member constantly tending to rotate said lever in one direction, a bellows tending to rotate the lever in the opposite direction, means for limiting the travel of said lever in each direction, a second lever, a tension link connecting said two levers and preventing separation thereof, an adjustable tension spring normally tending to cause rotation of said second lever and through the medium of said link, of said first lever in a direction opposing the action of said bellows, the arrangement being such that when the contact points of said link with said two levers are aligned with the pivot point of said first lever said tension spring has no rotative effect on said first lever, but when the bellows rotates said first lever out of the above mentioned position said second spring increasingly resists said motion.

9. In a control device of the type having, a resistance element and a resilient contact arm for slidingly engaging said element, the improvement which comprises a pivoted lever for controlling the position of said contact arm, an adjustable spring member constantly tending to rotate said lever in one direction, a bellows tending to rotate the lever in the opposite direction, means for limiting the travel of said lever in each direction, a second lever, a link connecting said two levers, a second adjustable spring normally tending to cause rotation of said second lever, the arrangement being such that when the contact points of said link with said two levers are aligned with the pivot point of said first lever said second spring has no rotative effect on said first lever but when the bellows rotates said first lever out of the above mentioned position said second spring increasingly resists said motion, and means for determining the position that said first lever assumes when the contact points of said link with said two levers are aligned with the pivot point of said first lever.

10. In combination, a casing, a control mechanism housed within said casing comprising a pivoted lever, a condition sensitive device tending to rotate the lever in one direction, spring means tending to rotate the lever in the opposite direction, adjusting means for said spring comprising a screw loosely projecting through a hole in the top of said casing, a nut threaded to said screw, an arm rigidly connected to said nut at one end and having its other end projecting through a slot in said casing and cooperating with indicia thereon, said spring being attached to said nut, a second lever, a link connecting said two levers, a second adjustable spring normally tending to cause rotation of said second lever, the arrangement being such that when the contact points of said link with said two levers are aligned with the pivot point of said first lever said second spring has no rotative effect on said first lever, but when the condition responsive element rotates said first lever out of the above mentioned position said second spring increasingly resists said motion, and means for adjusting the location of said above mentioned position.

11. In a mechanism of the character described, a control means, a condition sensitive device for operating said control means, spring means constantly under tension for exerting a force on said control means, means for preventing the force exerted by said spring means from having any substantial effect upon said control means for one predetermined position thereof, means for varying the position for which this is true, said force resisting any movement of said control means out of said predetermined position.

12. In a mechanism of the character described, a control means, a condition sensitive device for operating said control means, spring means constantly under tension for exerting a force on said control means, means for preventing the force exerted by said spring means from having any substantial effect upon said control means for one predetermined position thereof, means for varying the position for which this holds true, said force resisting any movement of said control means out of said predetermined position, and means for adjusting the amount of the force exerted by said spring means.

13. In a control device, a member adapted to move in response to condition changes, a lever actuated thereby, a fulcrum for said lever, a spring arranged to exert a pull on said lever in a direct line with said fulcrum when said lever is in one position, and to resist the movement of said lever from said position in proportion to the extent of its departure therefrom and means for adjusting said one position to any point within the range of the control device.

14. In a control device, a member adapted to move in response to condition changes, a lever actuated thereby, a fulcrum for said lever, a spring arranged to exert a pull on said lever in a direct line with said fulcrum when said lever is in one position, and to resist the movement of said lever from said position in proportion to the extent of its departure therefrom, means for adjusting the rate at which the spring resists the movement of said lever, and means for adjusting said one position to any point within the range of the control device.

15. In a mechanism of the character described, a pivoted lever, a spring constantly tending to rotate said lever in one direction, a condition responsive member for rotating the lever in the opposite direction, a second spring arranged to exert a pull on said lever in a direct line with its pivot when said lever is in one position at which time said second spring has a minimum length, rotation of said lever in either direction causing elongaton of said second spring, separate means for adjusting the tension of said second spring, and means for adjusting said one position to any point within the range of said mechanism.

16. In a mechanism of the character described, a pivoted lever, an adjustable spring member constantly tending to rotate said lever in one direction, a bellows tending to rotate the lever in the opposite direction, means for limiting the travel of said lever in each direction, a second lever, a tension link connecting said two levers and preventing separation thereof, an adjustable tension spring normally tending to cause rotation of said second lever and through the medium of said link, of said first lever in a direction opposing the action of said bellows, the arrangement being such that when the contact points of said link with said two levers are aligned with the pivot point of said first lever said tension spring has no rotative effect on said first lever, but when the bellows rotates said first lever out of the above mentioned position said second spring increasingly resists said motion, and means for adjusting the position that said first lever assumes when the contact points of said link with said two levers are aligned with the pivot point of said first lever.

17. In a control device of the type having a resistance element and a resilient contact arm for slidingly engaging said element, the improvement which comprises a pivoted lever for controlling the position of said contact arm, an adjustable spring member constantly tending to rotate said lever in one direction, a bellows tending to rotate the lever in the opposite direction, means for limiting the travel of said lever in each direction, a second lever, a link connecting said two levers, a second adjustable spring normally tending to cause rotation of said second lever, the arrangement being such that when the contact points of said link with said two levers are aligned with the pivot point of said first lever said second spring has no rotative effect on said first lever but when the bellows rotates said first lever out of the above mentioned position said second spring increasingly resists said motion, and means for determining the position that said first lever assumes when the contact points of said link with said two levers are aligned with the pivot point of said first lever, said means comprising a member adjustably connected to said first lever for varying the contact point between said first lever and said link.

18. In a mechanism of the character described, a pivoted lever arranged to be moved in opposite directions from a neutral intermediate position, condition responsive means for imparting movement to said lever in one direction, means biasing said lever in the opposite direction, a second biasing means, means connecting said second biasing means to said lever so that it has no effect thereon when said lever is in said neutral intermediate position, so that it aids the biasing effect of said first biasing means with a gradually increasing force as said lever is moved from said neutral position in one direction and so that it opposes the biasing effect of said first biasing means with a gradually increasing force as said lever is moved from said neutral position in said other direction, means varying the effect of said first biasing means so that the value of the condition required to move the lever to the neutral intermediate position may be varied, means varying the effect of said second biasing means so that the distance the lever is moved from said intermediate neutral position for a given change in the value of the condition may be varied, and means for adjusting the position of the lever when it is in its neutral intermediate position.

DANIEL G. TAYLOR.